US009459136B2

(12) United States Patent
Sato

(10) Patent No.: US 9,459,136 B2
(45) Date of Patent: Oct. 4, 2016

(54) ROBOT HAVING WORKPIECE MASS MEASUREMENT FUNCTION

(71) Applicant: FANUC CORPORATION, Yamanashi (JP)

(72) Inventor: Takashi Sato, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 122 days.

(21) Appl. No.: 14/271,033

(22) Filed: May 6, 2014

(65) Prior Publication Data

US 2014/0238157 A1    Aug. 28, 2014

Related U.S. Application Data

(62) Division of application No. 13/585,109, filed on Aug. 14, 2012, now Pat. No. 8,775,129.

(30) Foreign Application Priority Data

Sep. 9, 2011   (JP) .................. 2011-197072

(51) Int. Cl.
*B25J 19/02*    (2006.01)
*G01G 21/00*    (2006.01)
(Continued)

(52) U.S. Cl.
CPC ............. *G01G 21/00* (2013.01); *B25J 9/1633* (2013.01); *B25J 13/085* (2013.01); *B25J 19/02* (2013.01);
(Continued)

(58) Field of Classification Search
CPC ...... B25J 13/085; B25J 19/02; B25J 13/088; B25J 13/089; B25J 9/1633; G01G 9/00; G01G 19/086; G01G 19/00; G01G 21/00; G01L 5/16; G01L 5/009; G05B 2219/37357; G05B 2219/40549; G05B 2219/40606
USPC ................ 73/865, 495, 509, 510, 514.01, 73/862.541; 901/46; 702/141, 41, 702/174–175, 199; 177/139, 145, 148, 149
See application file for complete search history.

(56) References Cited

U.S. PATENT DOCUMENTS 4,165,975 A * 8/1979 Kwiatkowski ........... G01G 9/00
                                                      177/1
4,710,884 A    12/1987 Tokairin et al.
(Continued)

FOREIGN PATENT DOCUMENTS

DE    112008003243 T5    10/2010
DE    202009014292 U1 *  2/2011  ............. A01D 46/24
(Continued)

OTHER PUBLICATIONS

Office Action corresponding to JP2011-197072, dated Jan. 15, 2013.
(Continued)

*Primary Examiner* — Michael A Lyons
*Assistant Examiner* — David L Singer
(74) *Attorney, Agent, or Firm* — Hauptman Ham, LLP

(57) ABSTRACT

A robot (1) having a workpiece mass measurement function for measuring the mass of a workpiece that is held, includes a force measurement unit (5) that measures the force that is applied to the tip part (2) of the mechanism part of the robot (1), and a mass estimation unit (11) that estimates the mass of the workpiece that is held by the robot (1), based on information about the force acquired by the force measurement unit (5) while the robot (1) is moving.

10 Claims, 5 Drawing Sheets

(51) Int. Cl.
  *B25J 13/08* (2006.01)
  *G01L 5/16* (2006.01)
  *G01L 5/00* (2006.01)
  *G01G 19/08* (2006.01)
  *G01G 9/00* (2006.01)
  *B25J 9/16* (2006.01)

(52) U.S. Cl.
  CPC .............. *G01G 9/00* (2013.01); *G01G 19/086* (2013.01); *G01L 5/009* (2013.01); *G01L 5/16* (2013.01); *G05B 2219/37357* (2013.01); *G05B 2219/40549* (2013.01); *G05B 2219/40606* (2013.01); *Y10S 901/46* (2013.01)

(56) References Cited

U.S. PATENT DOCUMENTS

| | | | | |
|---|---|---|---|---|
| 4,906,907 A | * | 3/1990 | Tsuchihashi | B25J 9/06 318/568.16 |
| 5,837,945 A | * | 11/1998 | Cornwell | B65F 3/04 177/136 |
| 5,917,159 A | * | 6/1999 | Kostiuk | G01G 23/3728 177/136 |
| 6,225,574 B1 | | 5/2001 | Chang | G01G 19/08 177/139 |
| 6,314,383 B1 | * | 11/2001 | Leimbach | B60T 8/172 702/173 |
| 7,529,640 B2 | | 5/2009 | Fujiwara | G01C 9/00 702/127 |
| 2004/0176861 A1 | * | 9/2004 | Butler | G03F 7/70725 700/63 |
| 2006/0011390 A1 | * | 1/2006 | Paik | G01G 9/00 177/1 |
| 2008/0314649 A1 | * | 12/2008 | Hansen | G01G 19/083 177/139 |
| 2009/0139119 A1 | * | 6/2009 | Janardhan | B25J 9/1638 37/413 |

FOREIGN PATENT DOCUMENTS

| | | | |
|---|---|---|---|
| JP | 61-281304 A | | 12/1986 |
| JP | 01228783 A | * | 9/1989 |
| JP | 2-205490 A | | 8/1990 |
| JP | 5-57667 A | | 3/1993 |
| JP | 6-31667 A | | 2/1994 |
| JP | 2004-25387 A | | 1/2004 |
| JP | 2004-54838 A | | 2/2004 |
| JP | 2009-75954 A | | 4/2009 |
| WO | WO 2007148511 A1 | * | 12/2007 .......... G01L 1/2268 |
| WO | 2009073127 A2 | | 6/2009 |
| WO | 2009088828 A1 | | 7/2009 |

OTHER PUBLICATIONS

Office Action corresponding to JP2011-197072, dated Mar. 5, 2013.
Kroger, T; Kubus, D.; Wahl, F.M., "12D Force and Acceleration Sensing: A Helpful Experience Report on Sensor Characteristics," 2008 IEEE International Conference on Robotics and Automation, pp. 3455-3462, May 19-23, 2008.
Winkler, A.; Suchy, J., "Dynamic Force/Torque Measurement Using a 12DOF Sensor," Proceedings of the 2007 IEEE/RSJ International Conference on Intelligent Robots and Systems, pp. 1870-1875, Oct. 29-Nov. 2, 2007.
Office Action corresponding to DE 10 2012 017 328.8, dated Dec. 9, 2013.

* cited by examiner

ROBOT HAVING WORKPIECE MASS MEASUREMENT FUNCTION

RELATED APPLICATIONS

The present application is a divisional of U.S. patent application Ser. No. 13/585,109, filed Aug. 14, 2012, which claims priority to Japanese Application Number 2011-197072, filed Sep. 9, 2011, the disclosures of which are hereby incorporated by reference herein in their entirety.

BACKGROUND OF THE INVENTION

1. Technical Field

The present invention relates to a robot having a function for measuring the mass of a workpiece that is held by a robot having a force measurement unit.

2. Description of Related Arts

In order to inspect defective parts and products that are being manufactured, the mass of a workpiece is measured using a robot having a force measurement unit. To be more specific, a robot hand having a force measurement unit in a robot wrist part holds a workpiece. Then, the mass of the workpiece is measured from an output value of the force measurement unit then.

Such mass measurement is carried out, for example, by checking whether or not a plurality of workpieces that are being carried, when in fact only one workpiece needs to be held. Alternately, such mass measurement is also carried out to determine whether a workpiece is good or bad, based on whether or not the mass of a single workpiece is in a predetermined range.

Japanese Unexamined Patent Publication No. 6-31667 discloses conducting good product inspection, parts mounting inspection and type inspection of a workpiece, based on a mass measurement value, so as to sort workpieces. Furthermore, Japanese Unexamined Patent Publication No. 6-31667 discloses, in order to measure the mass of a workpiece, programming robot operations such that the mass of the workpiece applies to a force measurement unit vertically, and finding the difference between the output of the force measurement unit then and a predetermined reference mass.

Furthermore, Japanese Unexamined Patent Publication No. 5-57667 discloses a configuration which provides a pair of force measurement units (load cells) above and below a robot hand, respectively. Then, the mass of a workpiece is measured from the outputs of the measurement units when the workpiece is held from above and from below. In Japanese Unexamined Patent Publication No. 5-57667, in a state in which a hand holds a workpiece and a pair of load sensors are provided in a vertical direction, the workpiece is held still, and the mass of the workpiece is determined by subtracting the weight value of the upper load cell from the weight value of the lower load cell.

Incidentally, FIG. 7A and FIG. 7B are side views of a robot according to related art. The robot illustrated in these drawings is a vertical articulated robot, and a robot hand 3 is attached to a tip part 2 of an arm of the robot. Then, a force sensor 5 is provided between the tip part 2 and the hand 3 of the arm.

First, as illustrated in FIG. 7A, a robot 1 is made still in a state in which a workpiece W is not held, and the output of the force sensor 5 is recorded. Then, as illustrated in FIG. 7B, the hand 3 only holds the workpiece W (without changing the position and posture of the robot 1), and, in a state of being still, the output of the force sensor 5 is recorded. Then, the mass of the workpiece W is determined based on the deviation of the two outputs of the force sensor 5.

In this connection, in the event the force sensor 5 is a load cell with one axis, as illustrated in FIG. 7A and FIG. 7B, upon measurement of the force sensor 5, the force sensor 5 is required to be directed vertically downward. However, in the event the force sensor 5 is a force sensor of three or more axes, if the position and posture are the same when the workpiece W is not held and when the workpiece is held, the force sensor 5 may be in another posture than being directed vertically downward.

As described earlier, when measuring the mass of a workpiece W, the robot 1 needs to stay still. The reason is that, while the robot 1 is operating, not only the gravitational forces of the hand 3 and workpiece W, but also inertial forces such as the forces produced by acceleration/deceleration of the robot 1, the centrifugal force, the Coriolis force, and so on, are detected by the force sensor 5. Then, if the robot 1 is stopped still such that these gravitational forces and inertial forces do not apply, the robot 1 requires time to decelerate, time to stop, and time to re-accelerate. Consequently, the cycle time of the robot 1 increases significantly.

Furthermore, according to Japanese Unexamined Patent Publication No. 6-31667 and Japanese Unexamined Patent Publication No. 5-57667, upon measurement of a workpiece, the posture of the robot 1 needs to be changed such that the weight of the workpiece applies to the force measurement unit vertically.

The present invention has been made in view of the above backgrounds, and it is therefore an object of the present invention to provide a robot having a workpiece mass measurement function, whereby the mass of a workpiece can be acquired accurately even during handling operations.

SUMMARY OF THE INVENTION

To achieve the above object, according to the first mode, a robot having a workpiece mass measurement function for measuring the mass of a workpiece that is held is provided, and this robot includes: a force measurement unit that measures the force that is applied to the tip part of a mechanism part of the robot; and a mass estimation unit that estimates the mass of the workpiece that is held by the robot, based on the force acquired by the force measurement unit while the robot is moving.

According to a second mode, based on the first mode, the force measurement unit estimates the mass of the workpiece based on a force measurement value measured when the workpiece is held and a force measurement value that is measured when the workpiece is not held.

According to a third mode, based on the first mode or the second mode, the posture of the tip part of the mechanism part is not changed while the robot is moving.

According to a fourth mode, based on any one of the first mode to the third mode, an average value of a plurality of masses of the workpiece estimated by the mass estimation unit at a plurality of times while the robot is moving, is made a mass estimation value.

According to a fifth mode, based on any one of the first mode to the fourth mode, the mass estimation unit includes an acceleration acquiring unit that measures or estimates acceleration that applies to the tip part of the mechanism part of the robot, and the mass estimation unit estimates the mass of the workpiece that is held by the robot, based on the force measured by the force measurement unit while the robot is moving and the acceleration acquired by the acceleration acquiring unit.

According to a sixth mode, based on the fifth mode, the acceleration acquiring unit calculates the acceleration by a dynamics equation.

According to a seventh mode, based on the fifth mode, the acceleration acquiring unit acquires the acceleration measured by an acceleration sensor that is attached to the robot.

According to an eighth mode, based on any one of the first mode to the seventh mode, the force measurement unit measures the force in a plurality of directions; the acceleration acquiring unit acquires the acceleration in the plurality of directions; and the mass estimation unit estimates the mass with respect to the plurality of directions, so that an average value of a plurality of masses is made a mass estimation value.

According to a ninth mode, based on any one of the first mode to the seventh mode, the force measurement unit measures the force in a plurality of directions; the acceleration acquiring unit acquires the acceleration in the plurality of directions; and the mass estimation unit estimates the mass with respect to the plurality of directions, so that the mass corresponding to a direction where an absolute value of the acceleration is greatest, among the plurality of directions, is made a mass estimation value.

According to a tenth mode, based on any one of the first mode to the fourth mode, the mass estimation unit estimates the mass of the workpiece that is held by the robot, based on the force acquired by the force measurement unit while the tip part of the mechanism part is moving on a surface that is perpendicular to a direction of a gravitational force that applies to the tip part of the mechanism part of the robot.

According to an eleventh mode, based on any one of the first mode to the fourth mode, the mass estimation unit estimates the mass of the workpiece that is held by the robot, based on the force that is acquired by the force measurement unit while the tip part of the mechanism part of the robot is moving on a linear path at constant speed.

According to a twelfth mode, based on any one of the tenth mode and the eleventh mode, the robot further includes a posture acquiring unit that acquires a posture of the tip part of the mechanism part of the robot, and the mass estimation unit estimates the mass of the workpiece that is held by the robot, based on the forces in one or more directions measured by the force measurement unit and the posture acquired by the posture acquiring unit.

The objects, features, and characteristics of this invention other than those set forth above will become apparent from the description given herein below with reference to preferred embodiments illustrated in the accompanying drawings.

DETAILED DESCRIPTION

Embodiments of the present invention will be described below in detail with reference to the accompanying drawings. In the following drawings, the same members are assigned the same reference codes. The scale in these drawings is changed as appropriate for ease of explanation.

Figure 1:
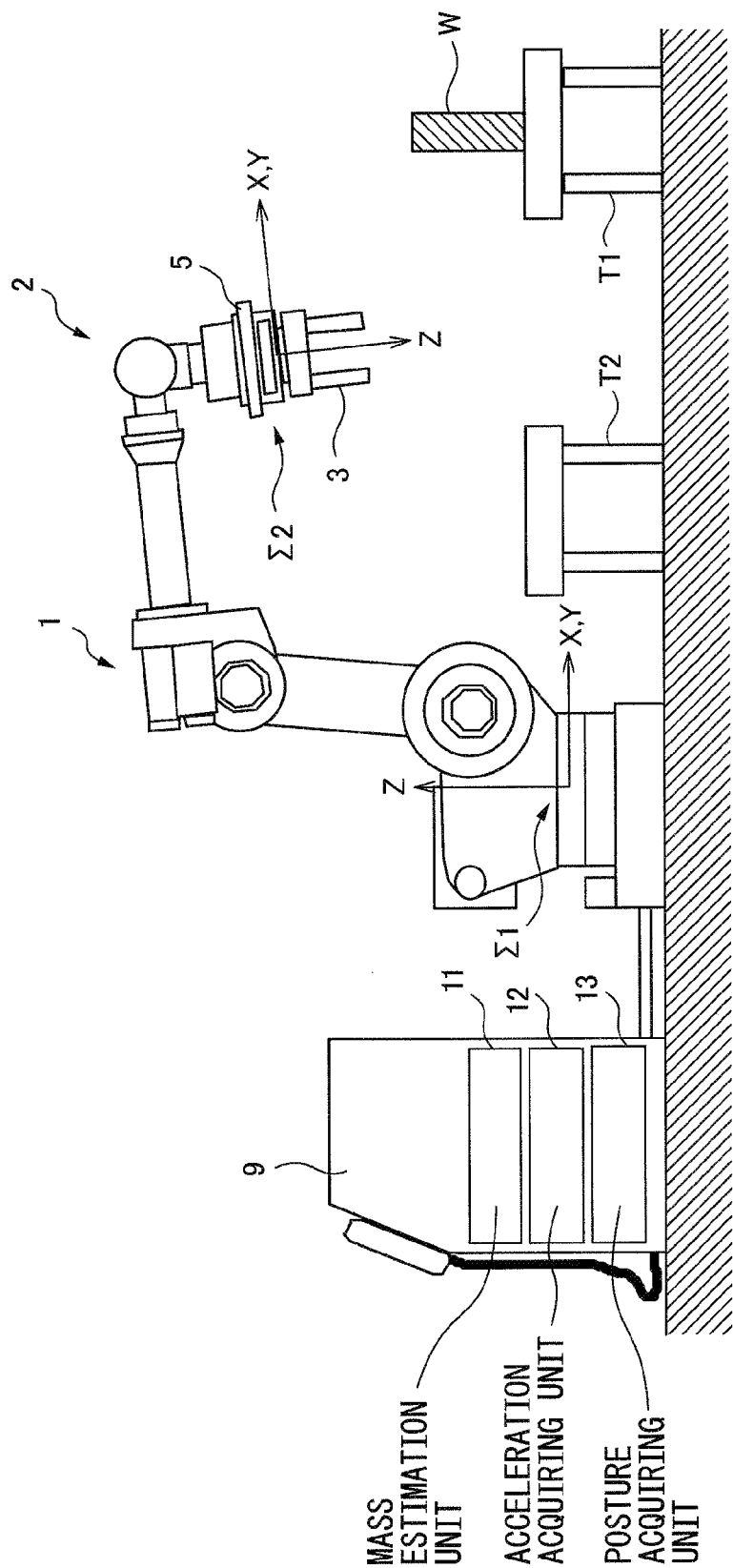
FIG. 1 is a side view of a robot based on the present invention.

FIG. 1 is a side view of a robot based on the present invention. In FIG. 1, the robot 1 is a vertical articulated robot or a known robot manipulator, and, at a tip part 2 of its arm, a hand 3 to hold a workpiece W is attached. Note that the hand 3 does not necessarily have to be attached to the tip part 2 of the arm of the robot 1.

The hand 3 is selected as adequate depending on the shape, material, mass and so on of the workpiece W. The hand 3 may be either the suction model or the chuck model. Furthermore, a force sensor 5 is provided between the tip part 2 of the arm and the hand 3.

In FIG. 1, two tables T1 and T2 are placed in the operation range of the robot 1, and a workpiece W is mounted on one table T1. Furthermore, as illustrated in FIG. 1, a robot controller 9, which controls the entirety of the robot 1, is connected to the robot 1. Note that the force sensor 5 is also connected to the robot controller 9.

The robot controller 9 is a digital computer, and has a mass estimation unit 11 that estimates the mass of the workpiece W, and an acceleration acquiring unit 12 that calculates the acceleration that works on the tip part 2 of the robot arm. Note that, instead of the acceleration acquiring unit 12, it is also possible to attach an acceleration sensor 6 (described later) to the hand 3. Furthermore, as illustrated in FIG. 1, the robot controller 9 includes a posture acquiring unit 13 that acquires the posture of the tip part 2 of the robot arm.

Furthermore, in FIG. 1, a reference coordinate system $\Sigma 1$ that is fixed to the base of the robot 1 and a force sensor coordinate system $\Sigma 2$ that is fixed to the force sensor 5, are illustrated. The relationship between the axial direction of the reference coordinate system $\Sigma 1$ and the gravitational direction is stored in advance in a storage unit (not illustrated) of the robot controller 9. Note that various data is stored in this storage unit.

Although normally the Z direction of the reference coordinate system $\Sigma 1$ and the gravitational direction are set to match, these may be set in different directions as well. In FIG. 1 and the drawings to be described later, the gravitational force applies downward in each drawing.

As the tip part 2 of the robot arm operates, the position and posture of the force sensor coordinate system $\Sigma 2$ with respect to the reference coordinate system $\Sigma 1$ changes. The position and posture of the force sensor coordinate system $\Sigma 2$ at a given time can be calculated by known forward kinematics calculations, using the angle of each axis of the robot 1 at that moment, the robot link length, etc.

Figure 2A:
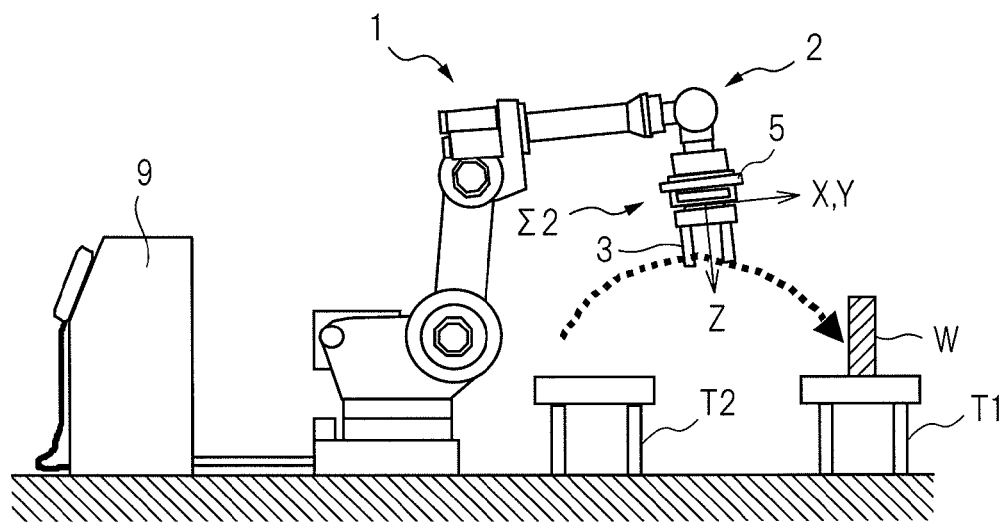
FIG. 2A is the first view illustrating robot operations based on embodiment 1 and/or the like of the present invention.
Figure 2B:
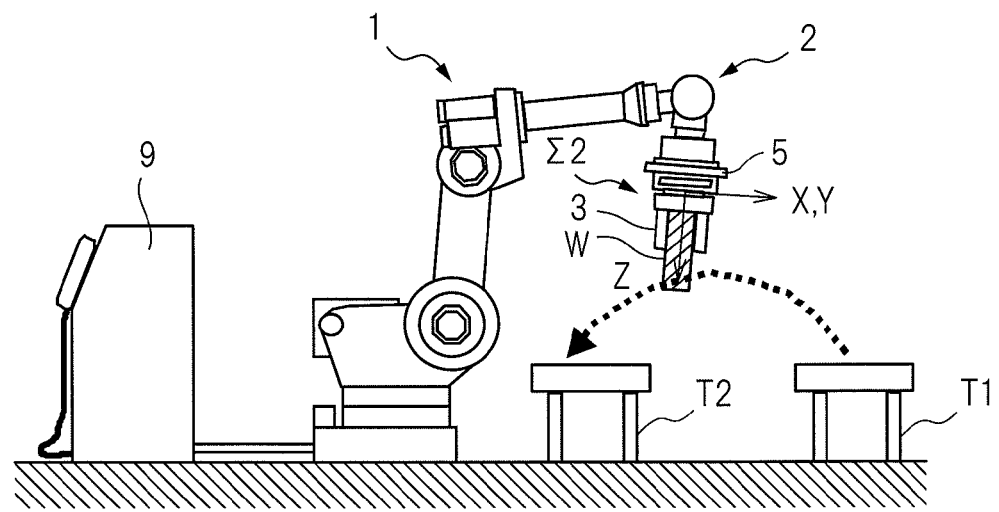
FIG. 2B is a second view illustrating robot operations based on embodiment 1 and/or the like of the present invention.

FIG. 2A and FIG. 2B are the first and second views, each illustrating robot operations based on embodiment 1 of the present invention, respectively. In FIG. 2A, in a state where the robot 1 does not hold a workpiece W, the tip part 2 is moved on a certain path, from the table T2 toward the table T1. At this time, the gravitational force of the hand 3, the inertial forces that are produced by the movement of the hand 3 and so on apply to the force sensor 5.

Also, in FIG. 2B, in a state where the robot 1 holds a workpiece W, the tip part 2 is moved on a certain path, from the table T2 toward the table T1. At this time, the gravitational forces of the hand 3 and workpiece W, the inertial forces that are produced by the movement of the hand 3 and workpiece W and so on apply to the force sensor 5.

Embodiment 1

In embodiment 1, the mass of the hand 3 is measured separately and known. Also, as the force sensor 5, a sensor of three or more axes is used, and therefore the sensor 5 is able to detect the force of three translational components.

In FIG. 2B, the workpiece W is held by the hand 3 of robot 1, and the robot 1 and workpiece W operate without contacting the peripheral equipment. Then, as illustrated in FIG. 2B, the output of the force sensor 5 when the robot 1 is operated so as not to change the posture of the wrist of the robot 1 as illustrated in FIG. 2B can be expressed by following equation 1. Note that the reason the posture of the wrist is not changed is to reduce the influence of disturbance such as the vibration of the robot.

$$F = (Mh + Mw) \cdot R \cdot \{g + d^2x/dt^2 + C(x, dx/dt)\} \qquad \text{(Equation 1)}$$

Here, F is a force vector that is detected by the force sensor 5 (detected value);

Mh is the mass of the hand 3;

Mw is the mass of the workpiece W;

R is a transform matrix from the reference coordinate system Σ1 to the force sensor coordinate system Σ2;

g is the gravitational acceleration vector seen from the reference coordinate system Σ1;

x is the position vector of the origin of the force sensor coordinate system Σ2 seen from the reference coordinate system Σ1;

$d^2x/dt^2$ is the second-order differential of x; and

C(x, dx/dt) is a vector to represent inertial force such as the centrifugal force and Coriolis force that apply to the hand 3 and workpiece W, and is a function of x and dx/dt.

Equation 1 holds with respect to arbitrary time, as long as the robot 1 does not contact the peripheral equipment. The force vector F at a given time while the robot 1 is operating is recorded. Then, a mass estimation unit 11 calculates x as of the same time, by forward kinematics calculations, from information such as the robot link length, the angle of each axis of the robot 1 and so on. Then, the mass estimation unit 11 also calculates g, $d^2x/dt^2$ and C(x, dx/dt), using x that is calculated. Note that the calculations to be described later is also performed mainly in the mass estimation unit 11.

Each term in equation 1 is a vector of three components and is formed with three equations, so that the mass Mw of the workpiece can be determined from each. Although these are all the same value ideally, actual calculations oftentimes give slightly different results.

Given that the masses acquired from the three equations are Mwx, Mwy and Mwz, Mw can be calculated by the following methods. The first method is to calculate an average value of Mwx, Mwy and Mwz, and Mw can be calculated easily and accurately by following equation 2.

$$Mw = (Mwx + Mwy + Mwz)/3 \qquad \text{(Equation 2)}$$

Alternately, among the three components of the vector $\{g + d^2x/dt^2 + C(x, dx/dt)\}$, the mass of the direction of the greatest absolute value may be employed. In other words, in a direction where the absolute value of acceleration is large, the influence of error factors such as noise becomes relatively insignificant, and therefore that result alone is used. In other words, assuming $\{g + d^2x/dt^2 + C(x, dx/dt)\} = (ax, ay, az)$, Mwx is employed as Mw if |ax| is the maximum, Mwy is employed if |ay| is the maximum, and Mwz is employed if |az| is the maximum.

In this way, the mass Mw of a workpiece W can be calculated using only equation 1 at one given time. However, it is also possible to determine the mass Mw of a workpiece W at a plurality of times and employ their average value. By this means, it is possible to reduce the influence of disturbances such as modeling errors due to individual variations of the length of robot links, the deflection of the links and so on, the variations of the output values of the force sensors, and vibrations by the shake of the robot itself, and determines the mass Mw of high reliability.

Embodiment 2

Figure 3:
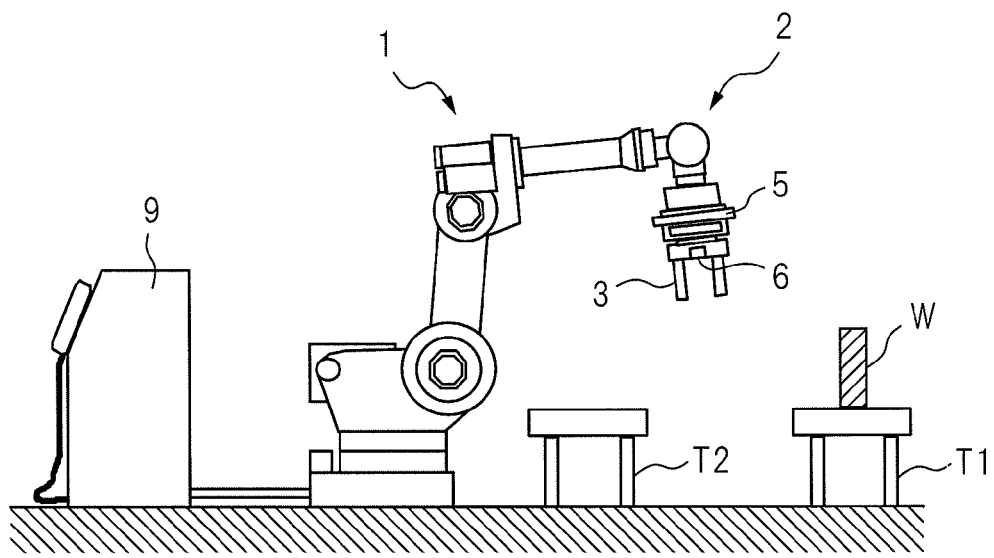
FIG. 3 is a view illustrating robot operations based on embodiment 2 and/or the like of the present invention.

FIG. 3 is a view to illustrate robot operations based on embodiment 2 of the present invention. As can be seen from this drawing, embodiment 2 is different from embodiment 1 in that an acceleration sensor 6 is attached to the base part of the hand 3. Furthermore, also with embodiment 2, a force sensor of three or more axes is used as the force sensor 5, and, consequently, the force sensor 5 is able to detect the force of three translational components. With embodiment 1 described above, the vector $\{g + d^2x/dt^2 + C(x, dx/dt)\}$ is determined by way of calculation, with embodiment 2, the above vector is determined using the output of the acceleration sensor 6.

As illustrated in FIG. 2B, in a state the robot 1 holds a workpiece W, the tip part 2 is moved on a certain path from the table T1 toward the table T2. The output of the force sensor 5 then can be expressed by following equation 3.

$$F = (Mh + Mw) \cdot A \qquad \text{(Equation 3)}$$

F is the force vector detected by the force sensor 5 (detected value);

Mh is the mass of the hand 3;

Mw is the mass of the workpiece W; and

A is the output vector of the acceleration sensor 6 converted into a value of the force sensor coordinate system Σ2.

As in the case of embodiment 1, a force vector F at a given time during the operation of the robot 1 is recorded. At this time, the output vector A of the acceleration sensor 6 at the given time is recorded likewise. The mass Mh of the hand 3 is known, so that the mass Mw of the workpiece W can be calculated by using equation 3.

Each term in equation 3 is a vector of three components and is formed with three equations, so that the mass Mw of the workpiece can be determined from each. Although these are all the same value ideally, actual calculations oftentimes give slightly different results.

Given that the masses acquired from the three equations are Mwx, Mwy and Mwz, Mw can be calculated in the following manners. The first method is to calculate an average value of Mwx, Mwy and Mwz, and Mw can be calculated easily by equation 2 given above.

Alternately, among the three components of the vector A, the result of the direction of the greatest absolute value may be employed. In other words, in a direction where the absolute value of acceleration is large, the influence of error factors such as noise becomes relatively insignificant, and therefore that result alone is used. In other words, assuming that A=(ax, ay, az), Mwx is employed as Mw if |ax| is the maximum, Mwy is employed if |ay| is the maximum, and Mwz is employed if |az| is the maximum.

In this way, the mass Mw of a workpiece W can be calculated using only equation 3 at one given time. However, it is also possible to determine the mass Mw of a workpiece W at a plurality of times and employ their average value. By this means, it should be understood that the influence of various errors can be reduced. Furthermore, given that the acceleration sensor 6 is employed with embodiment 2, it should be understood that acceleration can be determined more accurately and directly.

Embodiment 3

The force sensor 5 used in embodiment 3 is a force sensor of three or more axes, and is able to detect three translational components. Embodiment 3 is different from embodiment 1 described above, in carrying out measurement in two steps as described below. In other words, with embodiment 3, the mass of the hand 3 is also calculated, so that it is not necessary to measure the mass of the hand 3 in advance.

The first step will be described. As illustrated in FIG. 2A, in a state the hand 3 of the robot 1 does not hold a workpiece W, the hand 3 of the robot 1 is moved in the air without contacting the peripheral equipment. The output of the force sensor 5 when the robot 1 is operated so as not to change the posture of the wrist of the robot 1 can be expressed by following equation 4.

$$F1 = Mh \cdot R \cdot (g + d^2x/dt^2 + C(x, dx/dt)) \quad \text{(Equation 4)}$$

Here, F1 is a force vector that is detected by the force sensor 5 (detected value);
Mh is the mass of the hand;
R is a transform matrix from the reference coordinate system $\Sigma 1$ to the force sensor coordinate system $\Sigma 2$;
g is the gravitational acceleration vector seen from the reference coordinate system $\Sigma 1$;
x is the position vector of the origin of the force sensor coordinate system $\Sigma 2$ seen from the reference coordinate system $\Sigma 1$;
$d^2x/dt^2$ is the second-order differential of x; and
$C(x, dx/dt)$ is an acceleration vector according to the centrifugal force, Coriolis force and so on that apply to the tool, and is a function of x and dx/dt.

Equation 4 holds with respect to arbitrary time, as long as the robot 1 does not contact the peripheral equipment, and the force vector F1 at a given time while the robot 1 is operating is recorded. Then, the position vector x as of the same time is calculated by forward kinematics calculations, from information such as the robot link length, the angle of each axis of the robot 1, and so on. Then, furthermore, g, $d^2x/dt^2$ and $C(x, dx/dt)$ are derived using the position vector x. In this case, it is not necessary to provide an acceleration sensor 6, so that it is possible to make the configuration of the robot system simple and reduce the cost required to build the robot system.

Then, the mass Mh of the hand 3 is calculated by equation 4 from the above information. The mass Mh of the hand 3 is calculated from equation 4 at one given time, and, in addition to this, it is also possible to determine the mass Mh of the hand 3 at a plurality of times from equation 4 and calculate their average value. Due to the foregoing, it is possible to reduce the influence of disturbances such as modeling errors due to individual variations of the length of robot links, the deflection of the links and so on, the variations of the output values of the force sensors, and vibrations by the shake of the robot, and determines the mass Mh of high reliability.

Then, the second step will be described. As illustrated in FIG. 2B, in a state the hand 3 of the robot 1 holds a workpiece W, the hand 3 of the robot 1 is moved in the air without contacting the peripheral equipment. The output of the force sensor 5 when the robot 1 is operated so as not to change the posture of the wrist of the robot 1 can be expressed by following equation 5.

$$F2 = (Mh + Mw) \cdot R \cdot (g + d^2x/dt^2 + C(x, dx/dt)) \quad \text{(Equation 5)}$$

Here, F2 is a force vector that is detected by the force sensor (detected value);
Mh is the mass of the hand 3;
Mw is the mass of the workpiece W;
R is a transform matrix from the reference coordinate system $\Sigma 1$ to the force sensor coordinate system $\Sigma 2$;
g is the gravitational acceleration vector seen from the reference coordinate system $\Sigma 1$;
x is the position vector of the origin of the force sensor coordinate system $\Sigma 2$ seen from the reference coordinate system $\Sigma 1$;
$d^2x/dt^2$ is the second-order differential of x; and
$C(x, dx/dt)$ is an vector to represent the centrifugal force, Coriolis force and so on that apply to the tool and the workpiece, and is a function of x and dx/dt.

As in the first step described above, x, g, $d^2x/dt^2$ and $C(x, dx/dt)$ at a given time are calculated. The mass Mh of the hand 3 is already determined in the first step. Consequently, the mass Mw of the workpiece W is determined using equation 5.

Each term in equation 5 is a vector of three components and is formed with three equations, so that the mass Mw can be determined from each. Although these are all the same value ideally, actual calculations oftentimes give slightly different results.

Given that the masses acquired from the three equations are Mwx, Mwy and Mwz, Mw can be calculated in the following manners. The first method is to calculate an average value of Mwx, Mwy and Mwz, and Mw can be calculated easily by equation 2 given above.

Alternately, among the three components of the vector $(g+d^2x/dt^2+C(x, dx/dt))$, the result of the direction of the greatest absolute value may be employed. In other words, in a direction where the absolute value of acceleration is large, the influence of error factors such as noise becomes relatively insignificant, and therefore that result alone is used. In other words, assuming that $(g+d^2x/dt^2+C(x, dx/dt))=(ax, ay, az)$, Mwx is employed as Mw if |ax| is the maximum, Mwy is employed if |ay| is the maximum, and Mwz is employed if |az| is the maximum.

In this way, the mass Mw of a workpiece W can be calculated using only equation 5 at one given time. However, it is also possible to determine the mass Mw of a workpiece W at a plurality of times and employ their average value. By this means, it should be understood that the influence of various errors can be reduced.

Embodiment 4

As described earlier with reference to FIG. 3, an acceleration sensor 6 of three axes is attached to the hand 3. Although with embodiment 3 described above the acceleration $(g+d^2x/dt^2+C(x, dx/dt))$ was determined from the robot link length, the angle of each axis of the robot and so on, with embodiment 4, the output of the acceleration sensor 5 is used.

Similar to embodiment 3, with embodiment 4, a force sensor of three or more axes is used and therefore the force of three translational components can be used. Embodiment 4 is different from embodiment 2 described above in that measurement is carried out in two steps as described below. In other words, embodiment 4 calculates the mass of the hand 3.

To begin with, the first step will be described. As illustrated in FIG. 2A, in a state the hand 3 of the robot 1 does not hold a workpiece W, the hand 3 of the robot 1 moves in the air without contacting the peripheral equipment. The output of the force sensor 5 then can be expressed by following equation 6.

$$F1 = Mh \cdot A \quad \text{(Equation 6)}$$

F1 is the force vector detected by the force sensor 5 (detected value);

Mh is the mass of the hand 3; and

A is the output vector of the acceleration sensor 6 converted into a value of the force sensor coordinate system Σ2.

Equation 6 holds with respect to an arbitrary time if the robot 1 does not contact the peripheral equipment, and the force vector F1 of the force sensor 5 and the value A related to the acceleration sensor 6 at a given time are recorded. Then, the mass Mh of the hand 3 is calculated from equation 6 using these pieces of information.

The mass Mh of the hand 3 is calculated from equation 6 at one given time, and, in addition to this, it is also possible to determine the mass Mh of the hand 3 at a plurality of times and calculate their average value. By this means, it is possible to reduce the influence of disturbances such as modeling errors due to individual variations of the length of robot links, the deflection of the links, etc., the variations of the output values of the force sensors, and vibrations by the shake of the robot.

Then, the second step will be described. As illustrated in FIG. 2B, in a state the hand 3 of the robot 1 holds a workpiece W, the hand 3 of the robot 1 is moved in the air without contacting the peripheral equipment. The output of the force sensor 5 then can be expressed by following equation 7.

$$F2 = (Mh + Mw) \cdot A \quad \text{(Equation 7)}$$

F2 is the force vector detected by the force sensor 5 (detected value);

Mh is the mass of the hand 3;

Mw is the mass of the workpiece W; and

A is the output vector of the acceleration sensor 6 converted into a value of the force sensor coordinate system Σ2.

As in the first step, the force vector F2 of the force sensor 5 at a given time and the value A related to the acceleration sensor 6 are recorded. Then, the mass Mh of the hand 3 is determined in the first step, so that the mass Mw of the workpiece W can be determined using equation 7.

Each term in equation 7 is a vector of three components and is formed with three equations, so that the mass Mw of the workpiece can be determined from each. Although these are all the same value ideally, actual calculations oftentimes give slightly different results.

Given that the masses acquired from the three equations are Mwx, Mwy and Mwz, Mw can be calculated in the following manners. The first method is to calculate an average value of Mwx, Mwy and Mwz, and Mw can be calculated easily by equation 2 given above.

Alternately, among the three components of the vector A, the result of the direction of the greatest absolute value may be employed. In other words, in a direction where the absolute value of acceleration is large, the influence of error factors such as noise becomes relatively insignificant, and therefore that result alone is used. In other words, assuming that A=(ax, ay, az), Mwx is employed as Mw if |ax| is the maximum, Mwy is employed if |ay| is the maximum, and Mwz is employed if |az| is the maximum.

In this way, the mass Mw of a workpiece W can be calculated using only equation 7 at one given time. However, it is equally possible to determine the mass Mw of a workpiece W at a plurality of times and employ their average value. By this means, it should be understood that the influence of various errors can be reduced.

With embodiment 5 to embodiment 8 to be described later, either a load cell or a force sensor of one or more axes may be used as the force measurement unit. Assuming a case where an one-axis load cell is used, one direction in which the load can measure force will be hereinafter referred to as "measurement direction." The load cell is attached to a robot wrist such that the measurement direction and the gravitation force direction match when the robot wrist is postured to be directed vertically downward (see FIG. 4, which is a side view of the robot).

As the tip part 2 of the robot arm operates, the position and posture of the force sensor coordinate system Σ2 or the load cell 5 with respect to the reference coordinate system Σ1 changes. A posture acquiring unit 13 can determine the position and posture of the force sensor coordinate system Σ2 or the load cell 5 at a given time by known forward kinematics calculations, using the angle of each axis of the robot 1 at that moment, the robot link length, etc.

Figure 5A:
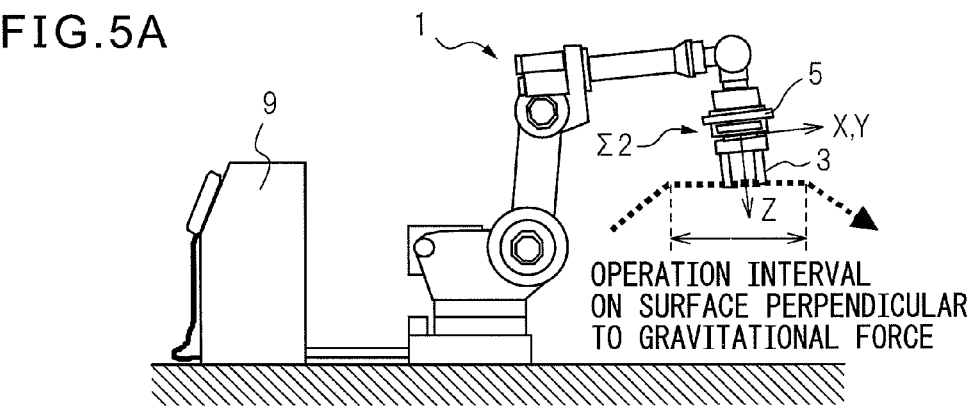
FIG. 5A is the first view illustrating robot operations based on embodiment 5 and/or the like of the present invention.

FIG. 5A is the first view illustrating robot operations based on embodiment 5 and/or the like of the present invention. FIG. 5A illustrates the situation where, in a state the robot 1 does not hold a workpiece W, the tip part 2 of a robot arm is operating on a surface that is perpendicular to the gravitational force direction. The gravitational force of the hand 3 and the inertial forces that are produced by the movement of the hand 3 and so on apply to the force sensor 5. However, inertial force components do not apply in the gravitational force direction, and the gravitational force alone applies.

Figure 5B:
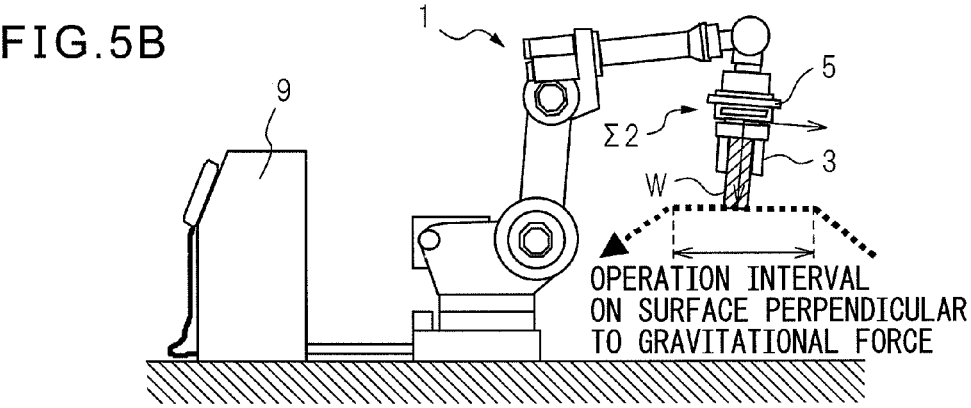
FIG. 5B is a second view illustrating robot operations based on embodiment 5 and/or the like of the present invention.

FIG. 5B is a second view illustrating robot operations based on embodiment 5 and/or the like of the present invention. FIG. 5B illustrates the situation where, in a state the robot 1 holds a workpiece W, the tip part 2 of a robot arm is operating on a surface that is perpendicular to the gravitational force direction. The gravitational force of the hand 3 and workpiece W and the inertial forces that are produced by the movement of the hand 3 and workpiece W and so on apply to the force sensor 5. However, inertial force components do not apply in the gravitational force direction, and the gravitational force alone applies.

Embodiment 5

With embodiment 5, the mass of the hand 3 is measured in advance and known, and a load cell 5 of one or more axes is used as the force measurement unit 5. As illustrated in FIG. 5B, in a state where the robot 1 holds a workpiece W, without contacting the peripheral equipment and so on, and without changing the posture of the wrist of the robot, the workpiece W is moved on a surface that is perpendicular to the gravitational force direction. The posture during the movement is constant, but does not necessarily have to match the gravitational force direction. Following equation 8 holds with respect to the force then.

$$F = (Mh + Mw) \cdot g \cdot \cos\theta \quad \text{(Equation 8)}$$

Figure 4:
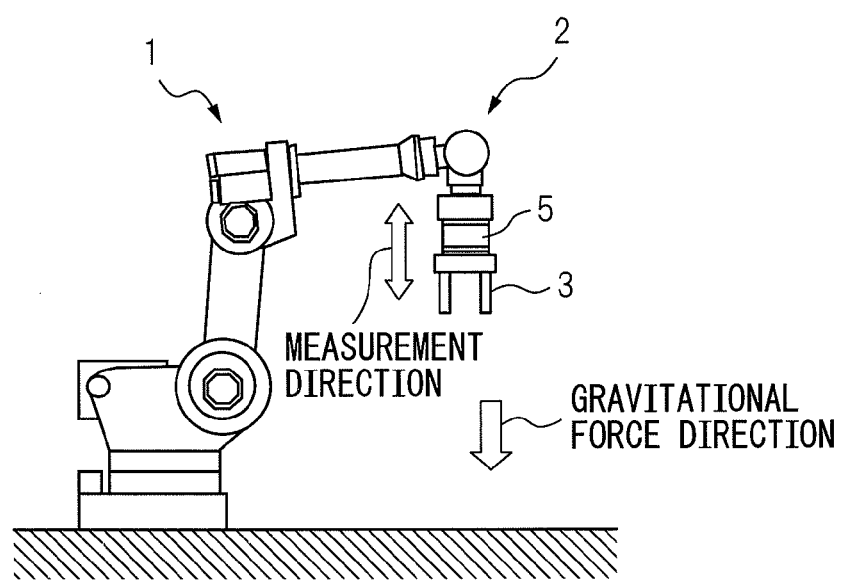
FIG. 4 is a side view of a robot.

F is the force detected by the load cell 5 (detected value);

Mh is the mass of the hand 3;

Mw is the mass of the workpiece W;

g is the gravitational acceleration; and

θ is the angle formed by the measurement direction and the gravitational force direction (for example, the angle θ in FIG. 4 is 0°).

Equation 8 holds with respect to an arbitrary time, as long as operating on a surface that is perpendicular to the gravitational force direction. Then, the force F at that given time is recorded.

The posture acquiring unit 13 can determine the position and posture of the load cell 5 with respect to the reference coordinate system Σ1 by known forward kinematics calculations, using the angle of each axis of the robot 1 at that moment, the robot link length, and so on. Since the gravitation force direction with respect to the reference coordinate system Σ1 is also known, θ at that moment can also be calculated. Then, given that the mass Mh of the hand 3 is known in advance, it is possible to calculate the mass Mw of the workpiece from equation 8. In this case, the inertial forces can be prevented from applying in the gravitational force direction, so that the mass of the workpiece W is made even more accurate.

The mass Mw of a workpiece W can be calculated using only equation 8 at one given time. However, it is equally possible to determine the mass Mw of a workpiece W at a plurality of times and employ their average value. By this means, it is possible to reduce the influence of disturbances such as the variations of the load cell output values, and vibrations by the shake of the robot itself.

Embodiment 6

With embodiment 6, the mass of the hand 3 is measured in advance and known, and a load cell 5 of three or more axes is used as the force measurement unit 5. As illustrated in FIG. 5B, in a state where the robot 1 holds a workpiece W, without contacting the peripheral equipment and so on, and without changing the posture of the wrist of the robot, the workpiece W is moved on a surface that is perpendicular to the gravitational force direction. The posture during the movement is constant, but does not necessarily have to match the gravitational force direction. Following equation 9 holds with respect to the force then.

$$F=(Mh+Mw) \cdot g \quad \text{(Equation 9)}$$

F is the gravitational force direction component of the force detected by the force sensor 5 (detected value);
Mh is the mass of the hand 3;
Mw is the mass of the workpiece W; and
g is the gravitational acceleration.

Although equation 8 described above is an equation related to the measurement direction, equation 9 is an equation related to the gravitational force direction. Equation 9 holds with respect to an arbitrary time, as long as operating on a surface that is perpendicular to the gravitational force direction, and the output of the force sensor 5 at a given time is recorded.

The output of the force sensor 5 is a value in the force sensor coordinate system Σ2 and has three components, X, Y and Z. As described above, the force sensor coordinate system Σ2 with respect to the reference coordinate system Σ1 and the gravitational force direction are both known, so that it is also possible to calculate the gravitational force direction component F of the output of the force sensor 5 at that moment. Then, since the mass Mh of the hand 3 is known, Mw is calculated from equation 9.

The mass Mw of a workpiece W can be calculated using only equation 9 at one given time. However, it is also possible to determine the mass Mw of a workpiece W at a plurality of times and employ their average value. By this means, it is possible to reduce the influence of disturbances such as the variations of the load cell output values, and vibrations by the shake of the robot itself.

Embodiment 7

With embodiment 7, a load cell 5 of one or more axes is used as the force measurement unit 5. Embodiment 7 is different from embodiment 5 described above in that measurement is carried out in two steps as described below. In other words, embodiment 7 calculates the mass of the hand 3.

To begin with, the first step will be described. As illustrated in FIG. 5A, in a state where the robot 1 does not hold a workpiece W, without contacting the peripheral equipment, etc., and without changing the posture of the wrist of the robot, the workpiece W is moved on a surface that is perpendicular to the gravitational force direction. The posture during the movement is constant, but does not necessarily have to match the gravitational force direction. Following equation 10 holds with respect to the force then.

$$F=Mh \cdot g \cdot \cos \theta \quad \text{(Equation 10)}$$

F is the force detected by the load cell 5 (detected value);
Mh is the mass of the hand 3;
g is the gravitational acceleration; and
θ is the angle formed by the measurement direction and the gravitational force direction.

Equation 10 holds with respect to an arbitrary time, as long as operating on a surface that is perpendicular to the gravitational force direction. Then, the force F at that given time is recorded.

The posture acquiring unit 13 can determine the position and posture of the load cell 5 with respect to the reference coordinate system Σ1 by known forward kinematics calculations, using the angle of each axis of the robot 1 at that moment, the robot link length, etc. Since the gravitation force direction with respect to the reference coordinate system Σ1 is also known, the angle θ at that moment can also be calculated. Then, the mass Mh of the hand 3 is calculated from equation 10 using these pieces of information.

The mass Mh of the hand 3 can be calculated using only equation 10 at one given time. However, it is equally possible to determine the mass Mh of the hand 3 at a plurality of times and employ their average value. By this means, it is possible to reduce the influence of disturbances such as the variations of the load cell output values, and vibrations by the shake of the robot itself.

Then, the second step will be described. As illustrated in FIG. 5B, in a state the robot 1 holds a workpiece W, without contacting the peripheral equipment and so on, and without changing the posture of the wrist of the robot 1, the workpiece W is moved on a surface that is perpendicular to the gravitational force direction. The posture during the movement is constant, but does not necessarily have to match the gravitational force direction. Following equation 11 holds with respect to the force then.

$$F=(Mh+Mw) \cdot g \cdot \cos \theta \quad \text{(Equation 11)}$$

F is the force detected by the load cell 5 (detected value);
Mh is the mass of the hand 3;
Mw is the mass of the workpiece W;
g is the gravitational acceleration; and
θ is the angle formed by the measurement direction and the gravitational force direction.

As in the first step described earlier, the force F at a given time is recorded, and the angle θ is calculated. Then, the mass Mh of the hand 3 is determined in the first step, so that the mass Mw of the workpiece W can be calculated from equation 11.

The mass Mw of a workpiece W can be calculated using only equation 11 at one given time. However, it is equally possible to determine the mass Mw of the workpiece W at a plurality of times and employ their average value. By this means, it is possible to reduce the influence of disturbances such as the variations of the load cell output values, and vibrations by the shake of the robot.

Embodiment 8

With embodiment 8, a force sensor 5 of three or more axes is used as the force sensor 5. Embodiment 8 is different from embodiment 6 described above, in carrying out measurement in two steps as described below. In other words, embodiment 8 calculates the mass of the hand.

To begin with, the first step will be described. As illustrated in FIG. 5A, in a state where the robot 1 does not hold a workpiece W, without contacting the peripheral equipment, etc. and without changing the posture of the wrist of the robot 1, the workpiece W is moved on a surface that is perpendicular to the gravitational force direction. The posture during the movement is constant, but does not necessarily have to match the gravitational force direction. Following equation 12 holds with respect to the force then.

$$F = Mh \cdot g \quad \text{(Equation 12)}$$

F is the gravitational force direction component of the force detected by the force sensor 5 (detected value);

Mh is the mass of the hand 3; and g is the gravitational acceleration.

Although equation 8 described above is an equation related to the measurement direction, equation 12 is an equation related to the gravitational force direction. Equation 12 holds with respect to an arbitrary time, as long as operating on a surface that is perpendicular to the gravitational force direction, and the output of the force sensor 5 at that given time is recorded.

The output of the force sensor 5 is a value in the force sensor coordinate system Σ2 and has three components, X, Y and Z. As described above, the force sensor coordinate system Σ2 with respect to the reference coordinate system Σ1 and the gravitational force direction are both known, so that it is also possible to calculate the gravitational force direction component F of the force of the force sensor 5 at that moment. The mass Mh of the hand 3 can be calculated from equation 12 using these pieces of information.

The mass Mh of the hand 3 can be calculated using only equation 12 at one given time. However, it is equally possible to determine the mass Mh of the hand 3 at a plurality of times and employ their average value. By this means, it is possible to reduce the influence of disturbances such as the variations of the load cell output values, and vibrations by the shake of the robot itself.

Then, the second step will be described. As illustrated in FIG. 5B, in a state the robot 1 holds a workpiece W, without contacting the peripheral equipment, etc., and without changing the posture of the wrist of the robot 1, the workpiece W is moved on a surface that is perpendicular to the gravitational force direction. The posture during the movement is constant, but does not necessarily have to match the gravitational force direction. Following equation 13 holds with respect to the force then.

$$F = (Mh + Mw) \cdot g \quad \text{(Equation 13)}$$

F is the gravitational force direction component of the force detected by the force sensor 5 (detected value);

Mh is the mass of the hand 3;

Mw is the mass of the workpiece W; and g is the gravitational acceleration.

As in the first step described earlier, the force component F at a given time is calculated. The mass Mh of the hand 3 is determined in the first step, so that the mass Mw of the workpiece W can be calculated using equation 13.

The mass Mw of a workpiece W can be calculated using only equation 13 at one given time. However, it is also possible to determine the mass Mw of the workpiece W at a plurality of times and employ their average value. By this means, it is possible to reduce the influence of disturbances such as the variations of the load cell output values, and vibrations by the shake of the robot itself.

Embodiment 9

Figure 6:
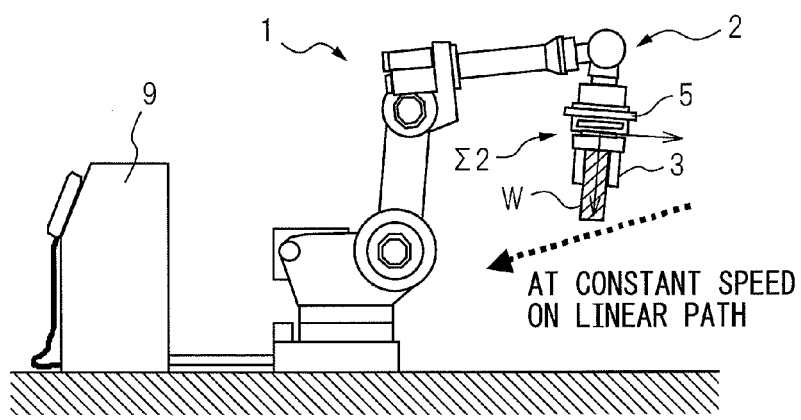
FIG. 6 is a side view of a robot based on embodiment 9 of the present invention.
Figure 7A:
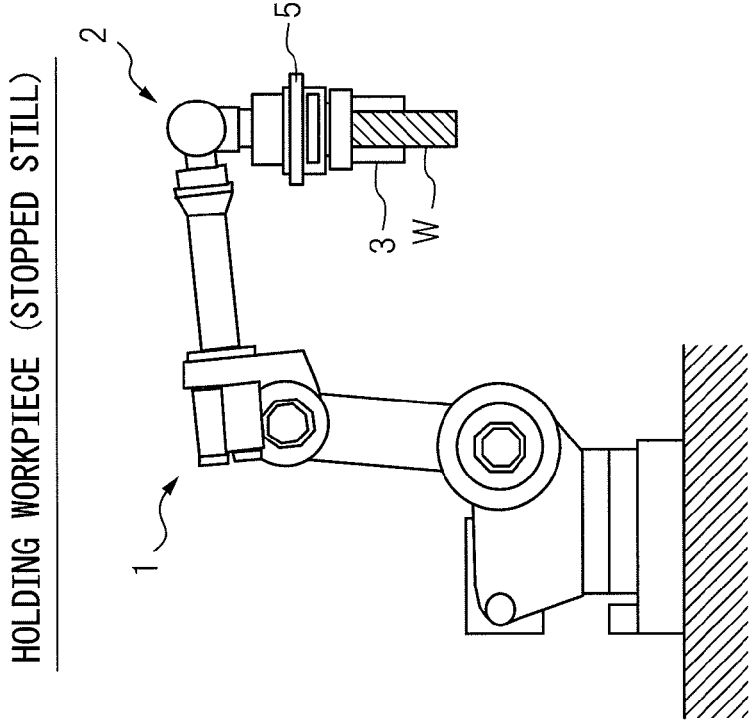
FIG. 7A is a side view of a robot according to prior art.
Figure 7B:
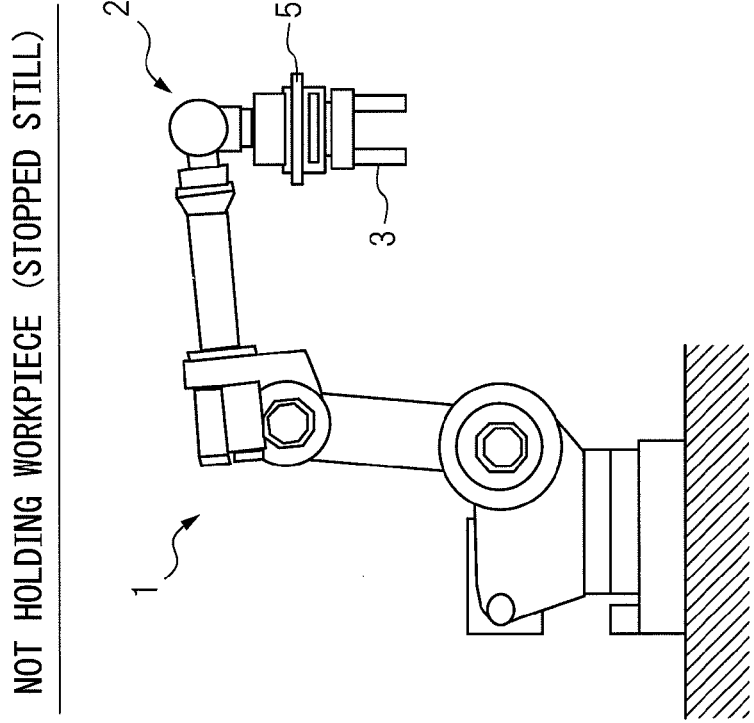
FIG. 7B is another side view of a robot according to prior art.

FIG. 6 is a side view of a robot based on embodiment 9 of the present invention. In FIG. 5 to FIG. 8, the tip part 2 of a robot arm moves on a surface that is perpendicular to the direction of the gravitational force that applies to the tip part 2 of the arm. In contrast with embodiment 9, as illustrated in FIG. 6, the tip part of the robot arm is moved at constant speed, on a linear path.

As can be seen from FIG. 6, this linear path does not necessarily have to be on a surface that is perpendicular to the gravitational force direction. By the limitations of constant speed and linear path, inertial forces such as the force required for acceleration and deceleration, the centrifugal force, the Coriolis force, etc. do not apply to the force measurement unit 5. Consequently, it should be understood that the mass Mh of a workpiece W is determined more accurately. Note that the method of calculating the mass Mw of a workpiece W is the same as in embodiment 5 to embodiment 8 described above, and therefore its description will be omitted.

In this way, according to the present embodiment, it is possible to calculate the mass of a workpiece W without stopping the robot 1. Therefore, the robot 1 does not require time to decelerate, time to stop, and time to re-accelerate. Consequently, the cycle time of robot operations does not increase following the mass measurement.

Furthermore, even if the robot 1 is operated by arbitrary activation, it is possible to acquire the mass of a workpiece W accurately, without being influenced by the dynamics terms. Furthermore, the present invention does not require a plurality of force measurement units and suffices with a single force measurement unit. Consequently, it is possible to make the configuration of the robot system simple and reduce the cost required to build the robot system. Note that it should be obvious to a person skilled in the art that other embodiments might likewise bring about the same advantages insofar as the same configuration is employed.

EFFECTS OF THE INVENTION

According to the first mode, it is possible to calculate the mass of a workpiece without stopping the robot. Consequently, the cycle time of robot operations does not increase following the mass measurement. Also, since a single force measurement unit suffices, it is possible to make the configuration of the robot system simple and reduce the cost required to build the robot system.

According to the second mode, even if the mass of a hand is not known, it is still possible to determine the mass of a workpiece.

According to the third mode, upon determining the mass of a workpiece, it is possible to reduce the influence of disturbances.

According to the fourth mode, it is possible to calculate the mass of a workpiece more accurately.

According to the fifth mode, it is possible to calculate the mass of a workpiece more accurately using acceleration.

According to the sixth mode, since an acceleration sensor is not necessary, it is possible to make the configuration of the robot system simple and further reduce the cost required to build the robot system.

According to the seventh mode, it is possible to determine acceleration more accurately and directly.

According to the eighth mode, an average value of a plurality of directions—for example, three directions of X, Y and Z—is used, so that it is possible to calculate the mass of a workpiece more accurately.

According to the ninth mode, since the mass is determined with respect to a direction where the absolute value of acceleration is large, so that it is possible to reduce the influence of error factors such as noise.

According to the tenth mode, it is possible to prevent inertial forces from applying in the gravitational force direction.

According to the eleventh mode, it is possible to cancel inertial forces such as the force required for acceleration and deceleration of the robot, the centrifugal force, the Coriolis force and so on.

According to the twelfth mode, by taking into account the posture of the robot, it is not necessary to operate the robot in a special posture such as, for example, directing a hand straight downward.

Although the present invention has been described using typical embodiments, a person skilled in the art should understand that the above-described changes, and various other changes, omissions, and additions are possible without departing from the scope of the present invention.

The invention claimed is:

1. A robot having a workpiece mass measurement function for measuring a mass of a workpiece held by the robot, the robot comprising:
   a force measurement unit configured to measure a force applied to a tip part of a mechanism part of the robot; and
   a mass estimation unit configured to estimate the mass of the workpiece held by the robot, based on the force measured by the force measurement unit while the robot is moving;
   wherein
   the mass estimation unit comprises an acceleration acquiring unit configured to acquire, by measuring or estimating, an acceleration applied to the tip part of the mechanism part of the robot;
   the mass estimation unit is configured to estimate the mass of the workpiece held by the robot, based on an equation between the force measured by the force measurement unit while the robot is moving, the acceleration acquired by the acceleration acquiring unit and the mass of the workpiece held by the robot;
   the force measurement unit is configured to measure the force in a plurality of directions;
   the acceleration acquiring unit is configured to acquire the acceleration in the plurality of directions;
   the mass estimation unit is configured to estimate the mass with respect to the plurality of directions, so that the mass corresponding to a direction where an absolute value of the acceleration is greatest, among the plurality of directions, is made a mass estimation value of the mass of the workpiece, and
   at a given time,
   the force measurement unit is configured to measure force values of the force in the plurality of directions,
   the acceleration acquiring unit is configured to acquire acceleration values of the acceleration in the plurality of directions,
   the mass estimation unit is configured to determine the greatest absolute value, among the acquired acceleration values, as corresponding to one direction among the plurality of directions, and
   the mass estimation unit is configured to use the force value and the acceleration value in said one direction to estimate the mass of the workpiece.

2. The robot as defined in claim 1, wherein the force measurement unit is configured to estimate the mass of the workpiece based on
   a force measurement value of the force measured by the force measurement unit when the workpiece is held by the robot, and
   a force measurement value of the force measured by the force measurement unit when the workpiece is not held by the robot.

3. The robot as defined in claim 1, wherein a posture of the tip part of the mechanism part is not changed while the robot is moving.

4. The robot as defined in claim 1, wherein an average value of a plurality of masses of the workpiece estimated by the mass estimation unit at a plurality of times while the robot is moving, is made a mass estimation value of the mass of the workpiece.

5. The robot as defined in claim 1, wherein the acceleration acquiring unit is configured to calculate the acceleration by a dynamics equation.

6. The robot as defined in claim 1, wherein the acceleration acquiring unit is configured to acquire the acceleration measured by an acceleration sensor attached to the robot.

7. The robot as defined in claim 1, wherein the mass estimation unit is configured to estimate the mass of the workpiece held by the robot, based on the force measured by the force measurement unit while the tip part of the mechanism part is moving on a plane perpendicular to a direction of a gravitational force applied to the tip part of the mechanism part of the robot without changing the posture of the tip part.

8. The robot as defined in claim 1, wherein the mass estimation unit is configured to estimate the mass of the workpiece held by the robot, based on the force measured by the force measurement unit while the tip part of the mechanism part of the robot is moving on a linear path at constant speed.

9. The robot as defined in claim 7, further comprising:
   a posture acquiring unit configured to acquire a posture of the tip part of the mechanism part of the robot,
   wherein the mass estimation unit is configured to estimate the mass of the workpiece held by the robot, based on the forces measured by the force measurement unit in the plurality of directions and the posture acquired by the posture acquiring unit.

10. The robot as defined in claim 8, further comprising:
    a posture acquiring unit configured to acquire a posture of the tip part of the mechanism part of the robot,
    wherein the mass estimation unit is configured to estimate the mass of the workpiece held by the robot, based on the forces measured by the force measurement unit in the plurality of directions and the posture acquired by the posture acquiring unit.

* * * * *